United States Patent
Jeffryes et al.

(10) Patent No.: US 7,330,401 B2
(45) Date of Patent: Feb. 12, 2008

(54) SEISMIC VIBRATORY ACQUISITION METHOD AND APPARATUS

(75) Inventors: Benjamin P. Jeffryes, Histon (GB); James Edward Martin, Cottenham (GB)

(73) Assignee: WesternGeco L.L.C., Houston, TX (US)

( * ) Notice: Subject to any disclaimer, the term of this patent is extended or adjusted under 35 U.S.C. 154(b) by 274 days.

(21) Appl. No.: 11/179,923

(22) Filed: Jul. 12, 2005

(65) Prior Publication Data
US 2006/0018192 A1 Jan. 26, 2006

(51) Int. Cl.
*G01V 1/00* (2006.01)

(52) U.S. Cl. .......................................... 367/189; 367/41

(58) Field of Classification Search ................. 367/189, 367/41; 702/14; 181/113
See application file for complete search history.

(56) References Cited

U.S. PATENT DOCUMENTS

| | | | |
|---|---|---|---|
| 5,410,517 A | 4/1995 | Andersen | |
| 6,181,646 B1 | 1/2001 | Bouyoucos et al. | |
| 6,418,079 B1 | 7/2002 | Fleure | |
| 6,603,707 B1* | 8/2003 | Meunier et al. | 367/189 |
| 2003/0210609 A1 | 11/2003 | Jeffryes | |
| 2006/0018192 A1* | 1/2006 | Jeffryes et al. | 367/41 |
| 2006/0250891 A1* | 11/2006 | Krohn | 367/38 |
| 2007/0195644 A1* | 8/2007 | Marples et al. | 367/39 |

FOREIGN PATENT DOCUMENTS

| | | |
|---|---|---|
| GB | 2 387 226 A | 10/2003 |
| WO | 98/53344 A1 | 11/1998 |
| WO | 02/33442 A2 | 4/2002 |
| WO | 02/33442 A3 | 4/2002 |

\* cited by examiner

*Primary Examiner*—Dan Pihulic
(74) *Attorney, Agent, or Firm*—Liangang (Mark) Ye; Jeffrey E. Griffin

(57) ABSTRACT

A method and related apparatus are described for generating acoustic signals for use in a vibratory seismic survey, including the step of combining into a drive signal a high frequency sweep signal, which sweeps upwardly through a high frequency band during a first time interval, and a low frequency sweep signal which is of lower amplitude than the high frequency sweep signal and which sweeps upwardly through a low frequency band during a second time interval, wherein the second time interval starts during the first time interval but after the beginning thereof; and applying the drive signal to a mechanical drive system for a vibratable element. The method improves the utilization of a single vibratory source.

17 Claims, 16 Drawing Sheets

SEISMIC VIBRATORY ACQUISITION METHOD AND APPARATUS

This invention relates to seismic surveying, and is more particularly concerned with the seismic surveying of earth formations using an acoustic source in the form of a vibrator which imparts a variable frequency signal into the earth formations, either directly in the case of surveying on land, or via water in the case of marine seismic surveying.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal that propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

One type of geophysical prospecting utilizes an impulsive energy source, such as dynamite or a marine air gun, to generate the seismic signal. With an impulsive energy source, a large amount of energy is injected into the earth in a very short period of time. Accordingly, the resulting data generally have a relatively high signal-to-noise ratio, which facilitates subsequent data processing operations. On the other hand, use of an impulsive energy source can pose certain safety and environmental concerns.

Since the late 1950s and early 1960s, a new type of geophysical prospecting, generally known as "VIBROSEIS"® prospecting, has been used. Vibroseis prospecting employs a land or marine seismic vibrator as the energy source. In contrast to an impulsive energy source, a seismic vibrator imparts a signal into the earth having a much lower energy level, but for a considerably longer period of time.

The seismic signal generated by a seismic vibrator is a controlled wavetrain (i.e., a sweep) which is applied to the surface of the earth or in the body of water or in a borehole. In seismic surveying on land using a vibrator, to impart energy into the ground in a swept frequency signal, the energy is typically imparted by using a hydraulic drive system to vibrate a large weight (the reaction mass) up and down. The reaction mass is coupled to a baseplate, in contact with the earth and through which the vibrations are transmitted to the earth. The baseplate also supports a large fixed weight, known as the hold-down weight. Typically, a sweep is a sinusoidal vibration of continuously varying frequency, increasing or decreasing monotonically within a given frequency range, which is applied during a sweep period lasting from 2 to 20 seconds or even more. The frequency may vary linearly or nonlinearly with time. Also, the frequency may begin low and increase with time (upsweep), or it may begin high and gradually decrease (downsweep).

The seismic data recorded during Vibroseis prospecting (hereinafter referred to as "vibrator data") are composite signals, each consisting of many long, reflected wavetrains superimposed upon one another. Since these composite signals are typically many times longer than the interval between reflections, it is not possible to distinguish individual reflections from the recorded signal. However, when the seismic vibrator data is cross-correlated with the sweep signal (also known as the "reference signal"), the resulting correlated data approximates the data that would have been recorded if the source had been an impulsive energy source.

The amount of energy injected into the earth during a conventional vibrator sweep is governed by the size of the vibrator and the duration of the sweep.

There are several of constraints on the amplitude of the vibrations. The most basic of these is that the hold-down weight must exceed the maximum upward force, so that the vibrator never loses contact with the ground. However, there are other constraints on low frequency output. Since, as already mentioned, the ground force is generated by vibrating a large weight, and the force generated by the weight is equal to its mass times its acceleration, at low frequencies for the same generated ground force the peak velocities and displacements are higher than at high frequencies. Typically, the lowest frequency that can be produced by a vibrator at a fixed force level is determined by the maximum stroke length possible for the vibratory weight, and the amount of time that the vibrator can spend at low frequencies is determined by the amount of hydraulic fluid stored in accumulators at the start of the sweep time and the maximum flow capacity of the hydraulic system.

Vibrators for use in marine seismic surveying typically comprise a bell-shaped housing having a large and heavy diaphragm, equivalent to the aforementioned baseplate, in its open end. The vibrator is lowered into the water from a marine survey vessel, and the diaphragm is vibrated by a hydraulic drive system similar to that used in a land vibrator. Alternative marine vibrator designs comprise two solid curved or hemispherical shells, joined together by an elastic membrane. The hydraulic drive moves the two shells relative to one another in a similar manner to the movement of the reaction mass in a land vibrator. Marine vibrators are therefore subject to operational constraints analogous to those of land vibrators.

Another problem with conventional Vibroseis prospecting results from the fact that vibrators generate harmonic distortion as a result of nonlinear effects in the vibrator hydraulics and the ground's nonlinear reaction to the force exerted by the vibrator baseplate, with the second and third harmonics accounting for most of the distortion. These harmonics are present in the recorded data and lead to trains of correlated noise, known as harmonic ghosts, in the correlated data. These harmonic ghosts are particularly troublesome in the case of downsweeps where they occur after the main correlation peak (i.e., positive lag times) and, therefore, can interfere with later, hence weaker, reflections. In the case of upsweeps, harmonic ghosts are somewhat less troublesome because they precede the main correlation peak (i.e., negative lag times). Nevertheless, harmonic ghosts can cause difficulties in processing and interpreting data from upsweeps as well as from downsweeps.

U.S. Pat. No. 5,410,517 issued to Andersen discloses a method for cascading or linking vibrator sweeps together to form a cascaded sweep sequence and optionally eliminating the listen period between successive sweeps. The initial phase angle of each individual sweep segment within a sweep sequence is progressively rotated by a constant phase increment of about 360/N degrees, where N is the number of sweep segments within the sweep sequence. Either the correlation reference sequence or the vibrator sweep sequence, but not both, contains an additional sweep segment positioned and phased so as to substantially suppress harmonic ghosts during correlation. When the additional sweep segment is included at the end of the vibrator sweep sequence, it increases the total acquisition time. If the correlation reference sequence includes the additional sweep segment, it complicates the processing in that the additional sweep segment has to be input at negative time giving a nonstandard correlation operator.

In the United Kingdom published patent application GB-A-2387226 there is disclosed a method of seismic acquisition using multiple vibrators using the so-called "slip-sweep" method. The method consists of a vibrator (or a vibrator group) sweeping without waiting for the previous vibrator's sweep to terminate. Correlation, which acts as a time-frequency filter, then extracts the individual records. A significant reduction in overall acquisition time is obtained. This is more efficient than the cascaded sweep since there is no need to wait for the end of a sweep before starting the next sweep. The reduction in overall acquisition time comes at the cost of increased harmonic distortion since the harmonics from the second sweep will correlate with the primary signals of the first sweep.

U.S. Pat. No. 6,418,079 issued to Fleure discloses a method for segmenting the spectral distribution of overlapped vibratory signals, thereby improving the efficiency of data acquisition while providing reduced harmonic distortion in the time zones of interest. Two identical sweep segments are used. Each sweep segment includes an earlier low frequency sweep and a later high frequency sweep, the individual sweeps having substantially no overlap in frequency except for tapering. The high frequency sweep in each pair starts before the end of the low frequency sweep with an overlap in time that is selected to avoid harmonics from the low frequency sweep. Correlation of the recorded signal separately with the low frequency sweep and the high frequency sweep gives data sets in which individual portions of the desired data are recoverable with the harmonic distortion largely separated from the desired data.

Another prior art way of seeking to overcome the problems resulting from the various constraints on land or marine vibrator operation is disclosed in U.S. Pat. No. 6,181,646. The vibrator source of the system (hereinafter referred to as the prior art system) described in that patent is driven so as to provide a composite sweep, in which a high frequency sweep and a low frequency sweep are carried out concurrently over the same time interval, i.e., both sweeps start at the same time and finish at the same time.

While the prior art system has several advantages, it also suffers from a number of drawbacks.

Firstly, starting both high and low frequency sweeps at the same time limits the force that can be generated at the bottom of the high frequency band. At this point in the sweep, the high-frequency sweep is limited by the hydraulic and stroke limitations of the vibrator, but to add a low-frequency sweep at the same time reduces the available resource for the high-frequency sweep.

Secondly, hydraulic vibrators inevitably generate energy not just at the desired frequency, but also at harmonics of that frequency. Harmonics of the low frequency sweep will lie in the same frequency band as the fundamental of the high-frequency sweep. If those harmonics are emitted between the time when the same frequency is emitted by the high-frequency sweep and the end time of the seismogram derived from the sweeps, then the harmonics will be interpreted as seismic signal and contaminate the seismogram.

Thirdly, in order to have complete spectral coverage, it is desirable that there should be some overlap between the high and low frequency sweeps. As a result, correlating the reflected seismic signals with the summed sweeps, i.e. with the drive to the vibrator, may lead to artifacts appearing in the seismogram at the overlap frequencies and reduces the opportunity for spectral balancing.

There is a need for an invention that acquires data with increased efficiency by using overlapping sweeps while providing some measure of protection against harmonics.

SUMMARY OF THE INVENTION

A method and related apparatus are described for generating acoustic signals for use in a vibratory seismic survey, including the step of combining into a drive signal a high frequency sweep signal, which sweeps upwardly through a high frequency band during a first time interval, and a low frequency sweep signal which is of lower amplitude than the high frequency sweep signal and which sweeps upwardly through a low frequency band during a second time interval, wherein the second time interval starts during the first time interval but after the beginning thereof; and applying the drive signal to a mechanical drive system for a vibratable element.

The method improves the utilization of a single vibratory source by starting the low frequency sweep within the sweep time of the high frequency sweep. In difference to the existing methods, the present invention uses a shorter low frequency sweep which starts well within the time window of the high frequency sweep. The starting point of the signal can be defined as the point at which the signal begins to contribute noticeable to the load on the drive mechanism of the vibrator. Hence, there exists a starting period during which only the high frequency sweep provides a significant load. The first and second time intervals may end at substantially the same time.

Either sweep signal may include taper or ramp sections at either the beginning or the end of their respective duration. In case of the low frequency sweep signals the length of each taper second is preferably less than 2 seconds, more preferably less than 1 second The combined sweep signal generated by suitable circuitry known as such is usually amplified to serve as a pilot signal to the hydraulic drive system of the vibratory element, e.g. the baseplate in the case of a Vibroseis truck.

The first time interval may be about 10 seconds long, while the second time interval may be about 7 seconds long. And each second time interval may be preceded and followed by a respective taper period of about a second.

Preferably, the upper end of the second frequency band slightly overlaps the lower end of the first frequency band. Thus the first frequency may conveniently extend from about 10 Hz to about 100 Hz, while the second frequency band may conveniently extend from about 2 Hz to about 12 Hz.

When generating a seismogram from the acquired receiver signals, the raw data, the deconvolution or correlation steps usually applied in Vibroseis operation may be performed using the high frequency sweep and the low frequency sweep signals or any derivatives thereof separately. Thus, two separate seismograms can be generated. Before recombining the high frequency seismogram and the low frequency seismogram for the purpose of further processing, the invention preferably includes the step of matching both in their overlap frequency range.

The invention will now be described, by way of non-limitative example only, with reference to the accompanying drawings.

EXAMPLES

Figure 1A:
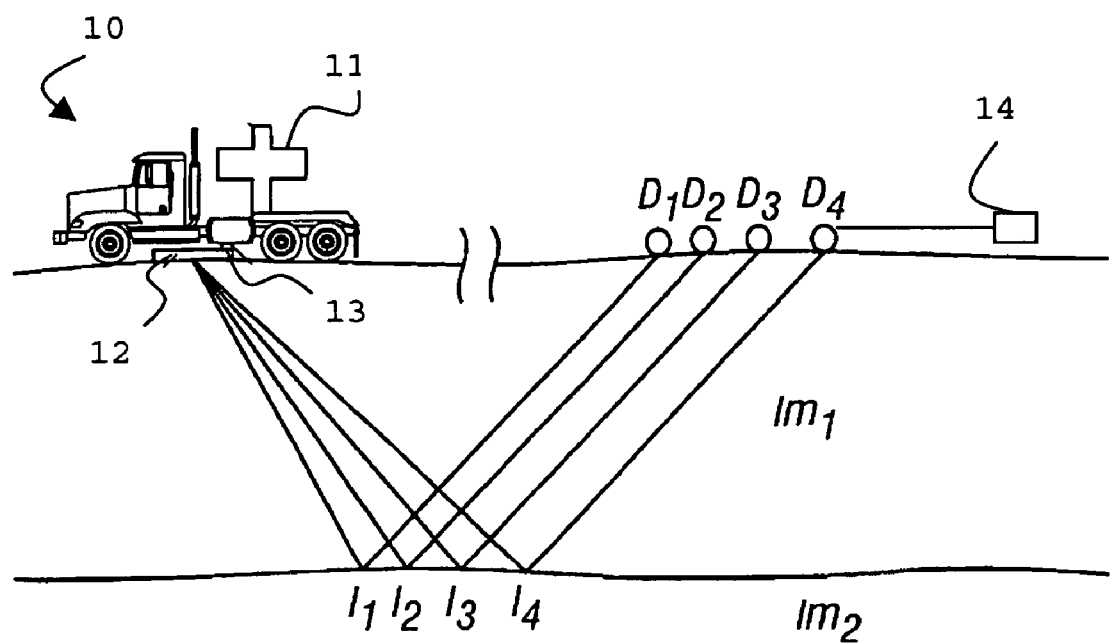
FIG. 1A illustrates elements of a Vibroseis seismic survey.

The system of FIG. 1A illustrates in a simplified manner a Vibroseis acquisition using a vibrator 11 with a baseplate 12 and a signal measuring apparatus 13, for example accelerometers, whose signals are combined to measure the actual groundforce signal applied to the earth, all located on a truck 10.

The signal that is generated into the earth by vibrator 11 is reflected off the interface between subsurface impedances Im1 and Im2 at points I1, I2, I3, and I4. This reflected signal is detected by geophones D1, D2, D3, and D4, respectively. The signals generated by vibrator 11 on truck 10 are transmitted to a data storage 14 for combination with raw seismic data received from geophones D1, D2, D3, and D4 and further processing.

In operation a control signal, referred to also as pilot sweep, causes the vibrator hydraulics 11 to exert a variable pressure on the baseplate 12.

Figure 1B:
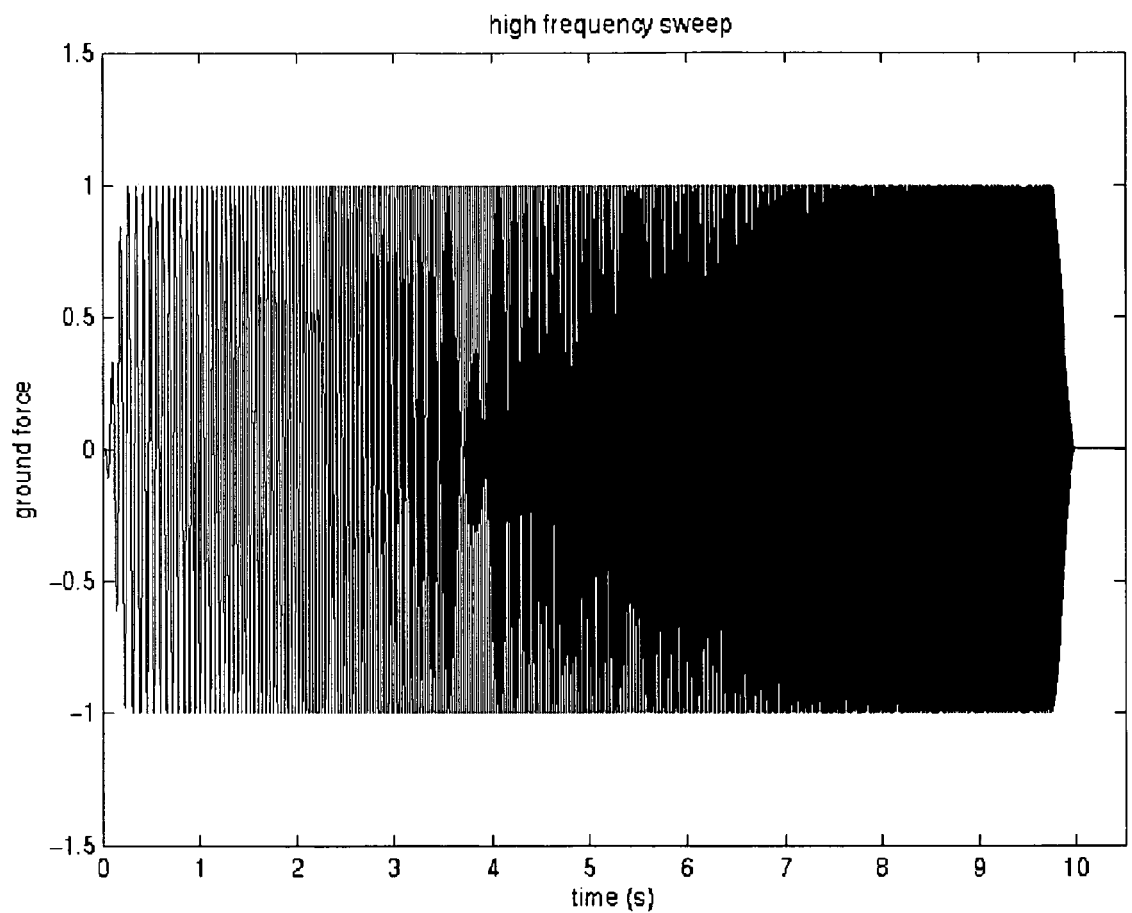
FIG. 1B is a plot of a typical high frequency sweep as used in known Vibroseis seismic surveys.

As can be seen in FIG. 1B, a typical prior art high frequency sweep goes from 10 Hz to 100 Hz over 10 seconds, with 0.25 second tapers. In this sweep, the force applied to the ground can be described mathematically by the expression $$F_h(t) = W_h(t) \cos\left(2\pi\left(\phi + \int_{t_0}^{t} f_h(\tau)d\tau\right)\right) \quad [1]$$

where $W_h(t)$ is the strictly positive amplitude envelope function, normally a constant over most of the duration of the sweep, tapering up from zero at the beginning of the sweep at time $t_0$ and down to zero at the end at time $t_1$, $\phi$ is the starting phase of the sweep, $f_h$ is the instantaneous frequency of the sweep, going from $f_0$ at time $t_0$ to $f_1$ at time $t_1$.

Normally the frequency increases linearly with time, but the rate of change of frequency does not have to remain constant.

Figure 2:
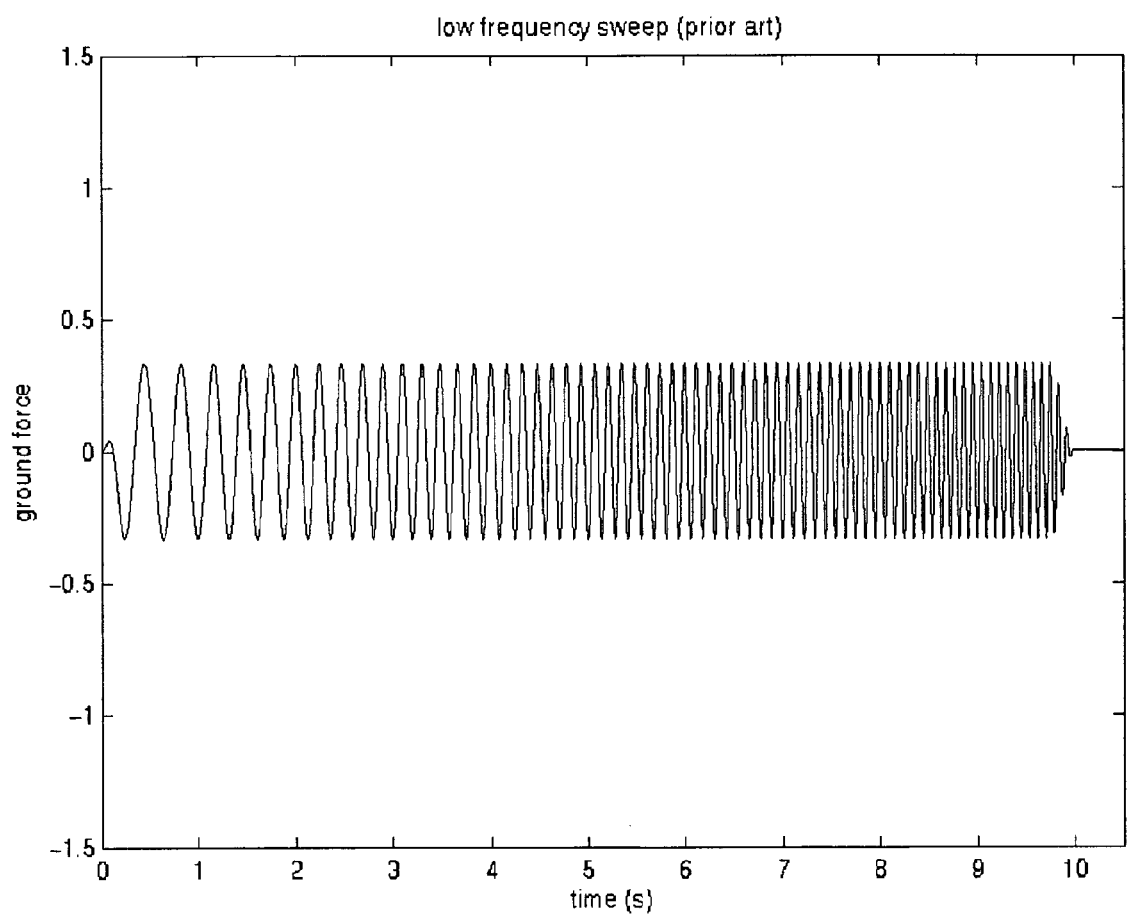
FIG. 2 is a plot of a typical low frequency sweep as used in known Vibroseis seismic surveys.
Figure 3:
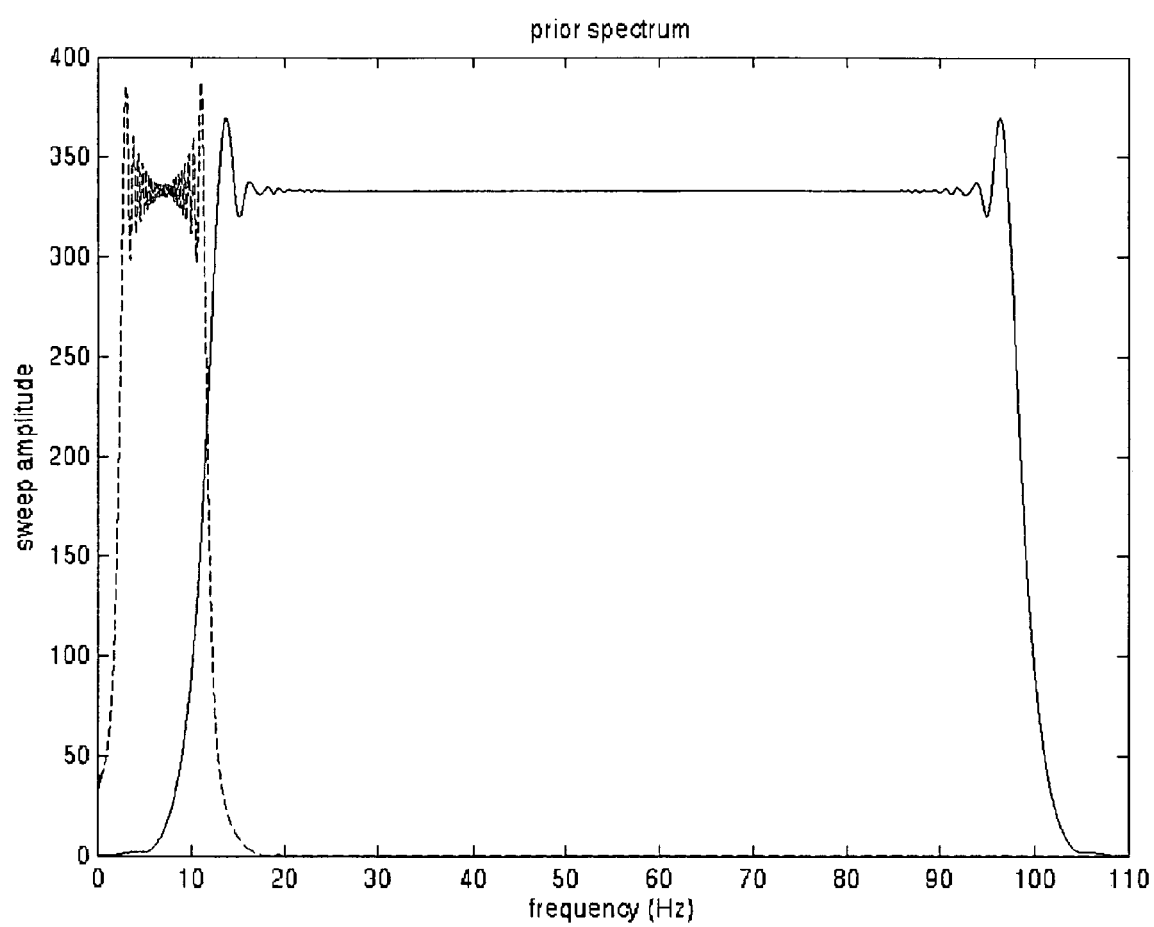
FIG. 3 is a plot of the power spectrum of the sweeps of FIGS. 1B and 2.

The prior art low frequency sweep of FIG. 2 goes from 2 Hz to 12 Hz, with 0.25 second tapers, and thus overlaps the frequency band of the high frequency sweep of FIG. 1B: this is to avoid a gap in the frequency spectrum at the frequencies in the respective tapers. As described in the U.S. Pat. No. 6,181,646, the low frequency sweep covers the same duration as the high frequency sweep, and is designed so that the energy for each frequency is the same as for the high frequency sweep. The low frequency sweep is lower in amplitude, but also has a lower sweep rate. Using the same notation as in equation (1), if the low frequency sweep force is denoted by $$F_l(t) = W_l(t) \cos\left(2\pi\left(\theta + \int_{t_0}^{t} f_l(\tau)d\tau\right)\right) \quad [2]$$

then $$W_l^2 \frac{df_h}{dt} = W_h^2 \frac{df_l}{dt} \quad [3]$$

Figure 4:
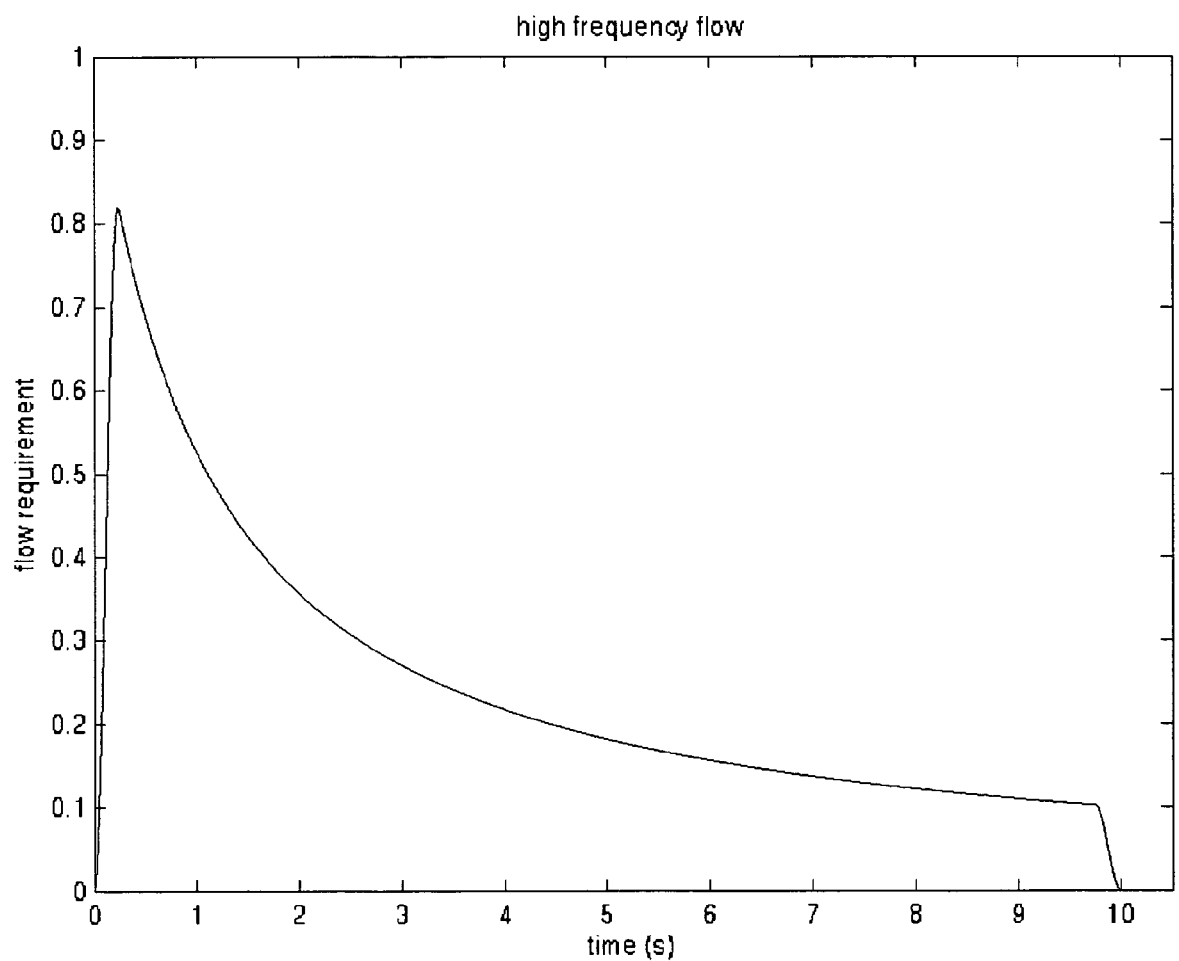
FIGS. 4 and 5 show the respective maximum system hydraulic fluid flow requirements for the prior art sweeps of FIGS. 1B and 2.
Figure 5:
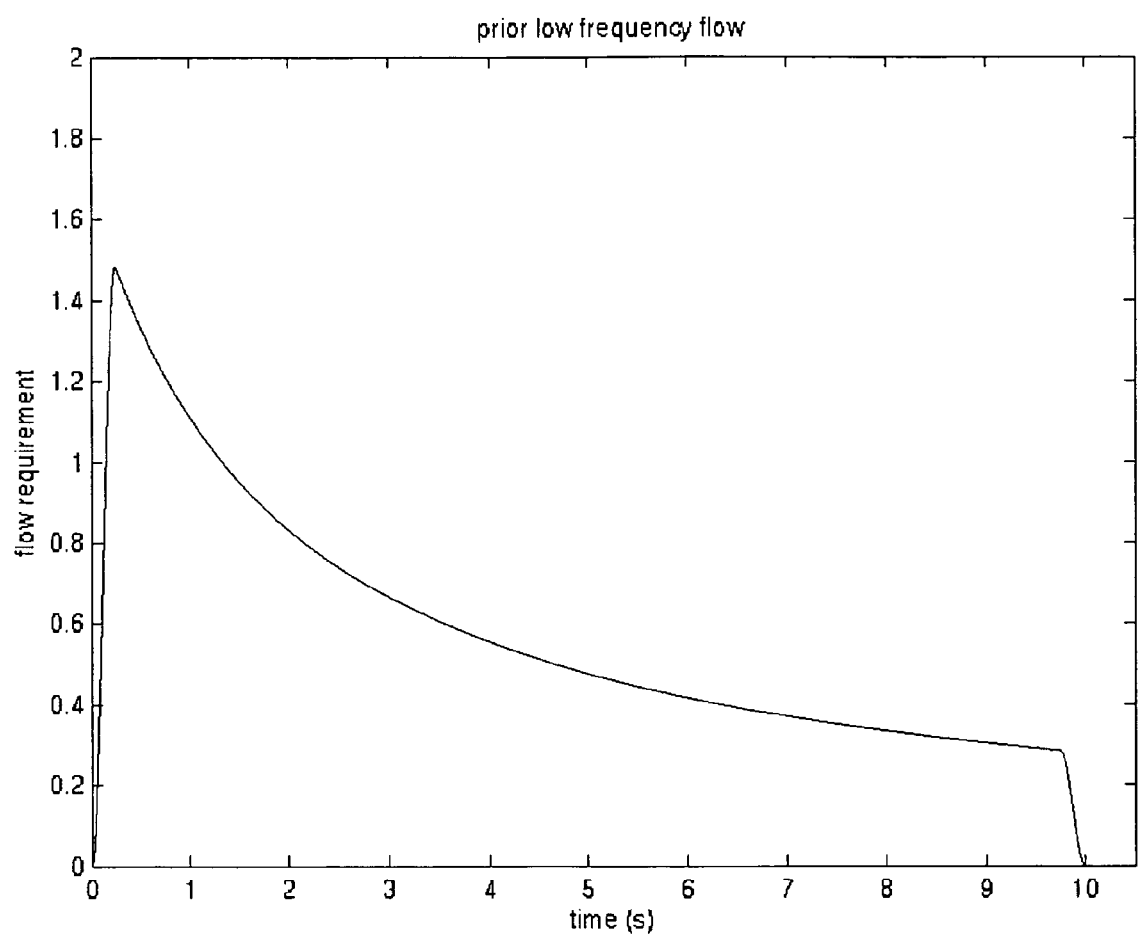
Figure 6:
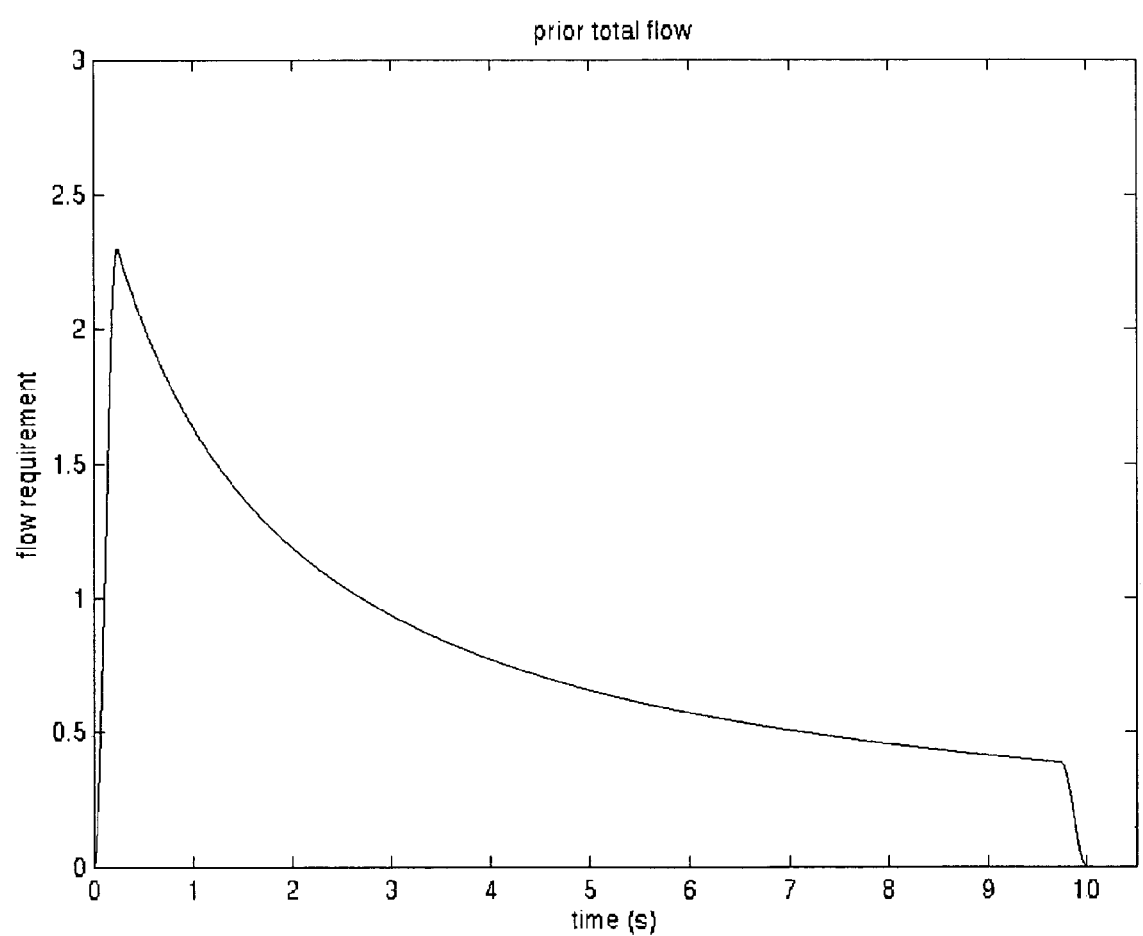
FIG. 6 shows the maximum system flow requirements if the sweeps of FIGS. 1B and 2 are performed concurrently.

If the plateau force level for the high-frequency sweep is W, then, on rigid ground, the flow requirement for the vibrator is proportional to $W/f_h(t)$. The displacement requirement is $W/f_h^2(t)$ (on an elastic surface, the flow requirement will be reduced, as the vibration of the baseplate contributes significantly to the ground force. However, at the low frequency end of the spectrum where high flows and displacements occur, there is not much deviation from the rigid case. The flow requirement for the high frequency sweep of FIG. 1 is shown in FIG. 4. The same equation, with the appropriate substitutions, holds for the low frequency sweep. The flow requirement for the low frequency sweep according to the prior art is shown in FIG. 5, with the combined flow requirement shown in FIG. 6.

If the total flow capacity of the vibrator is less than the maximum of the sum of the two flow requirements, then the vibrator will be unable to perform the desired sweeps. One solution to this is to reduce the overall force output, so that if the total flow capacity of the vibrator is 1 (in the scaling of FIGS. 4 to 6), then the total force output would be reduced to approximately 45% of the previous level, with a corresponding reduction in overall signal to noise ratio in the resulting seismic data.

The present invention is based on our appreciation that normal vibrator sweeps typically start at low frequencies and increase the frequency over the course of the sweep, so that, although at the start of the sweep the vibrator is constrained in amplitude by stroke length and hydraulic capacity, later on in the sweep the main constraint is the peak force level. During this period of the sweep, therefore, an additional low-frequency, low amplitude sweep signal can be added to the sweep without exceeding the vibrator stroke length and hydraulic capacity limits, as long as the sum of the amplitudes of the two signals does not exceed the hold-down weight of the vibrator. An example of such an additional sweep signal is shown in FIG. 7.

Figure 7:
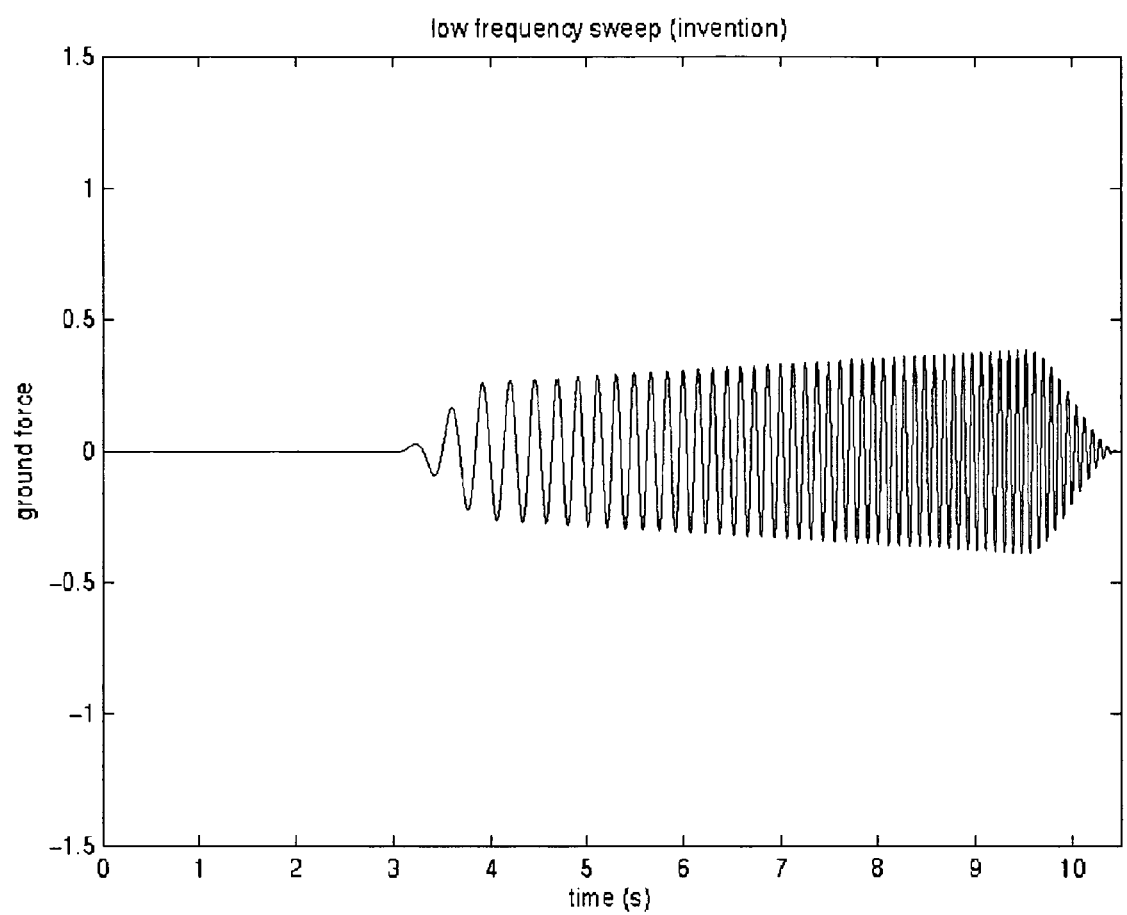
FIG. 7 shows a low frequency sweep as used in the present invention.

As can be seen in FIG. 7, the start of the additional sweep is delayed by about three seconds with respect to the start of the high frequency sweep.

Delaying the start time of the additional sweep has two beneficial effects. Firstly a higher output can be obtained at lower frequencies, allowing a higher force output without exceeding the total flow capacity of the vibrator. Secondly, the time at which harmonics of the low-frequency sweep appear in the seismogram can be moved back, moving most of their effect out of the listening time of the seismogram.

The listening time depends on the geophysical objectives of the survey, not the sweep parameters, and is the length of the seismogram after cross-correlation or deconvolution has converted the original recording of the earth response to the vibrator sweeps into a seismogram corresponding to the earth response to a short impulse with the same bandwidth as the sweeps. In the example shown in FIG. 7, it is assumed that the listening time is four seconds.

The low frequency sweep, from 2 to 12 Hz starts at 3 seconds, and as can be seen in FIG. 7, is also given longer tapers, typically about one second, in order to reduce band-limit ripple effects. In the example shown, the vibrator finishes the second sweep completely at about 10.5 seconds. With this sweep, the largest harmonic contamination, at three times the fundamental, does not affect the seismogram until the vibrator has reached 3.3 Hz, which occurs at 3.9 seconds, thus almost all the harmonic contamination is out of the seismogram.

If the maximum flow capacity of the vibrator is C, and α is the constant of proportionality linking force to flow, then at time t, the available flow in the vibrator for low frequencies is given by $$C = \frac{\alpha W}{f_h(t)} \quad [4]$$

If the low frequency sweep starts at time T, and has a bottom frequency of $f_{0L}$, then the force achievable for a constant-force sweep starting at this frequency is given by $$W_L = \frac{Cf_l}{\alpha} - \frac{Wf_{0L}}{f(T)} \quad [5]$$

Figure 8:
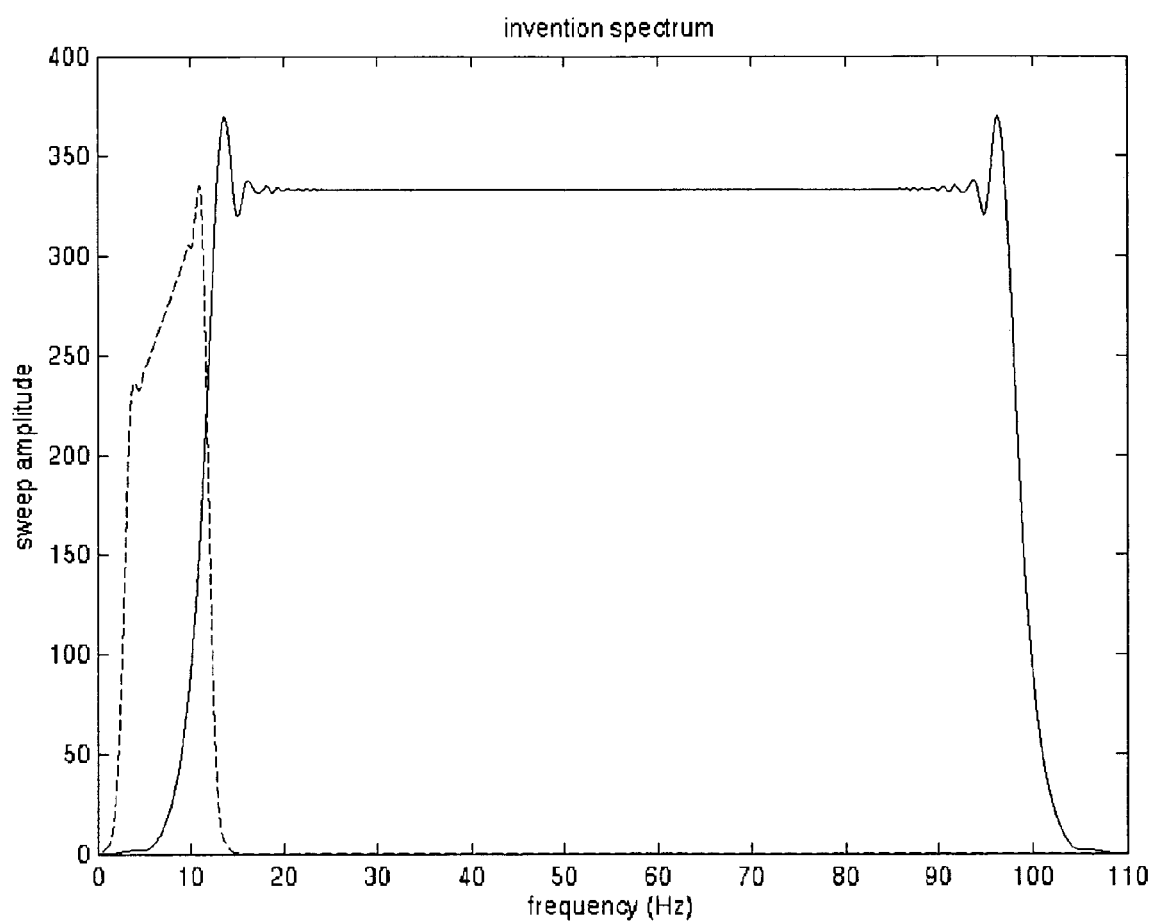
FIG. 8 shows the power spectrum of the sweeps of FIGS. 1 and 7.
Figure 9:
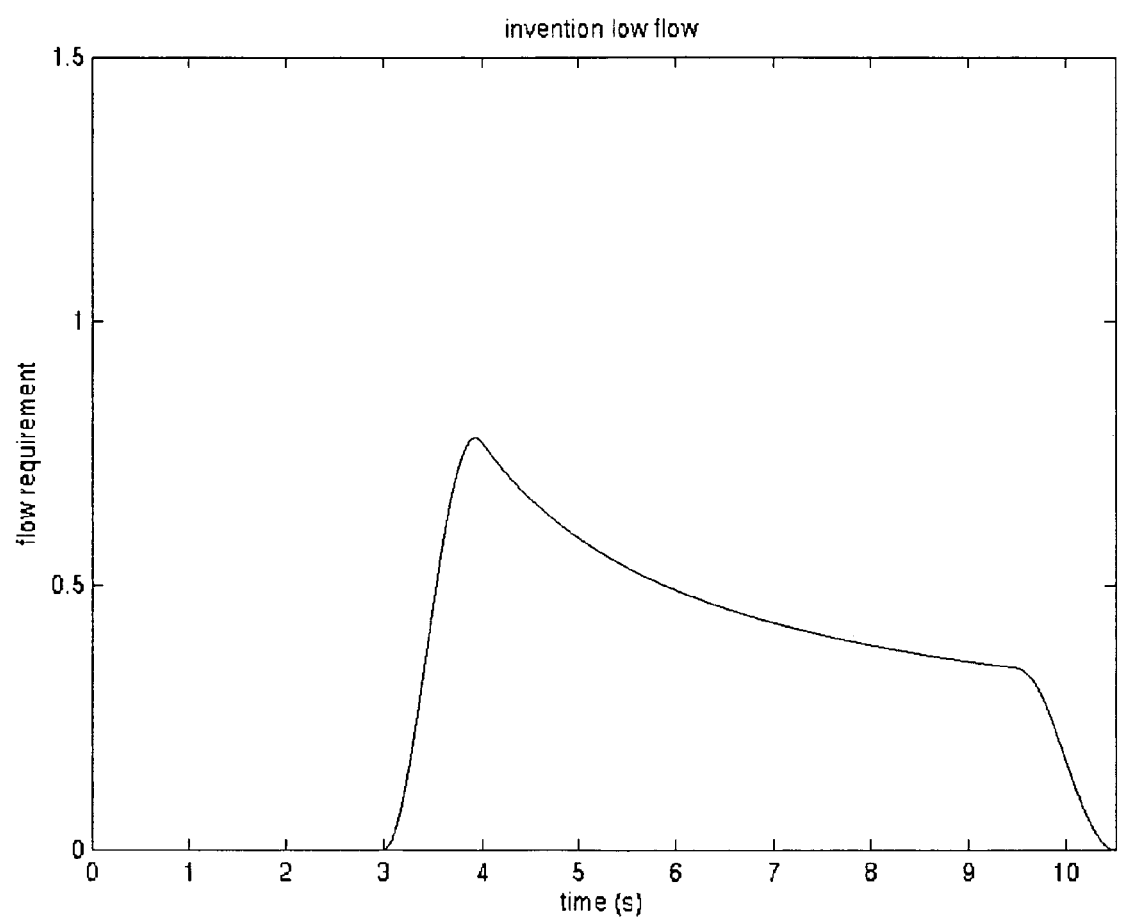
FIG. 9 shows the maximum system flow requirements for the sweep of FIG. 7.
Figure 10:
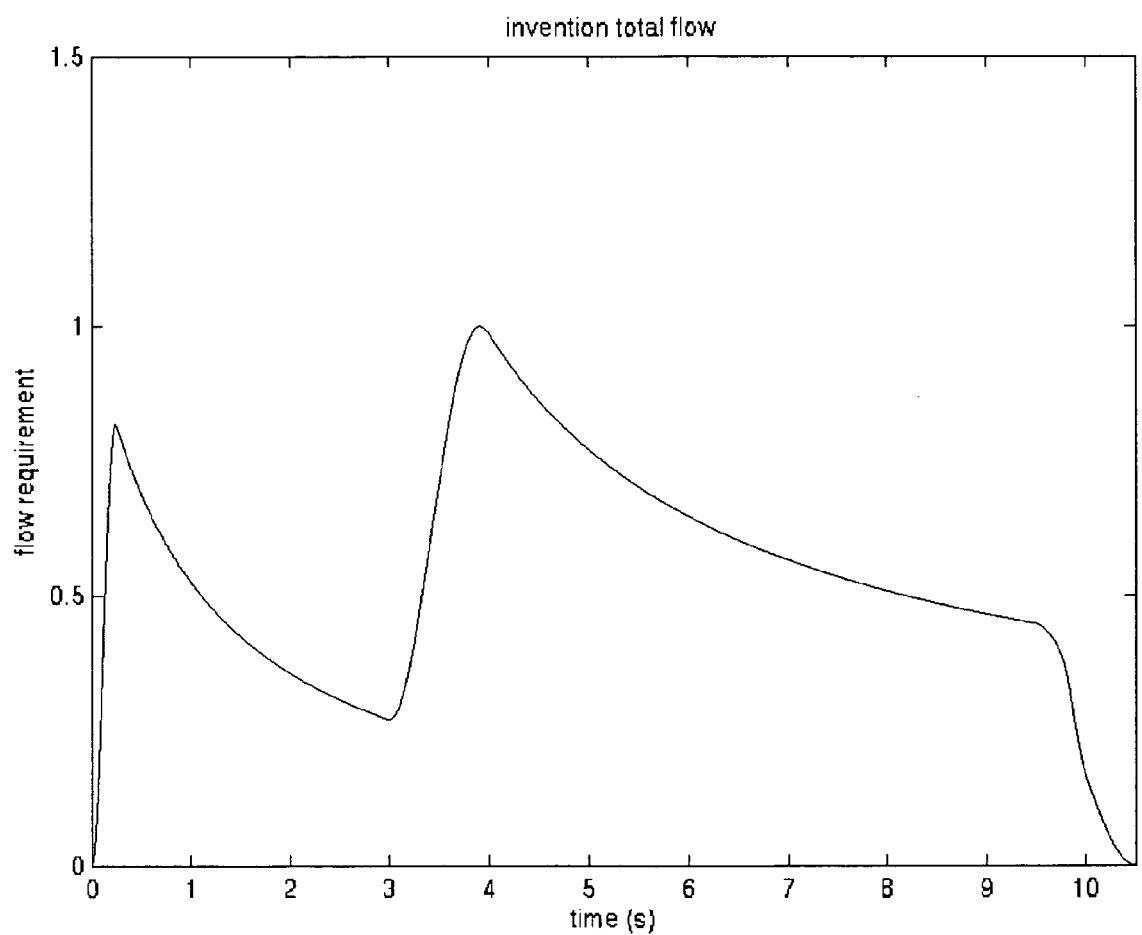
FIG. 10 shows the maximum system flow requirement when the sweeps of FIGS. 1B and 7 are performed concurrently.

For the sweep shown in FIG. 7, the flow limit is 1, and the force amplitude climbs linearly from $W_L$ to the same level as in the prior art, with an additional one second taper at the beginning and end of the sweep. The power spectrum of the low frequency sweep is shown (along with the power spectrum of the high frequency sweep) in FIG. 8, where it can be seen that the amplitude spectrum rises smoothly from about 3 Hz up to 10 Hz. The total flow requirement of the low frequency sweep is shown in FIG. 9, while the total flow requirement of the high and low frequency sweeps together is shown in FIG. 10. FIG. 10 clearly demonstrates that the total flow requirements of the combined sweeps do not exceed the vibrator capacity (1 in the units shown).

If the main constraint is not flow, but vibrator displacement, then a similar procedure may be followed using the displacement available rather than the flow.

Another constraint is the total force. If the total force required for the high and low frequency sweeps is too high, rather than just scaling back the overall force level, the force output for the high frequency sweep may be kept high before the low frequency sweep starts, and then reduced as the low frequency sweep increases in amplitude. The high-frequency sweep rate may also be adjusted along with the amplitude, to keep the output power flat with frequency (sweep rate should be proportional to the square root of the amplitude to achieve this).

Figure 11:
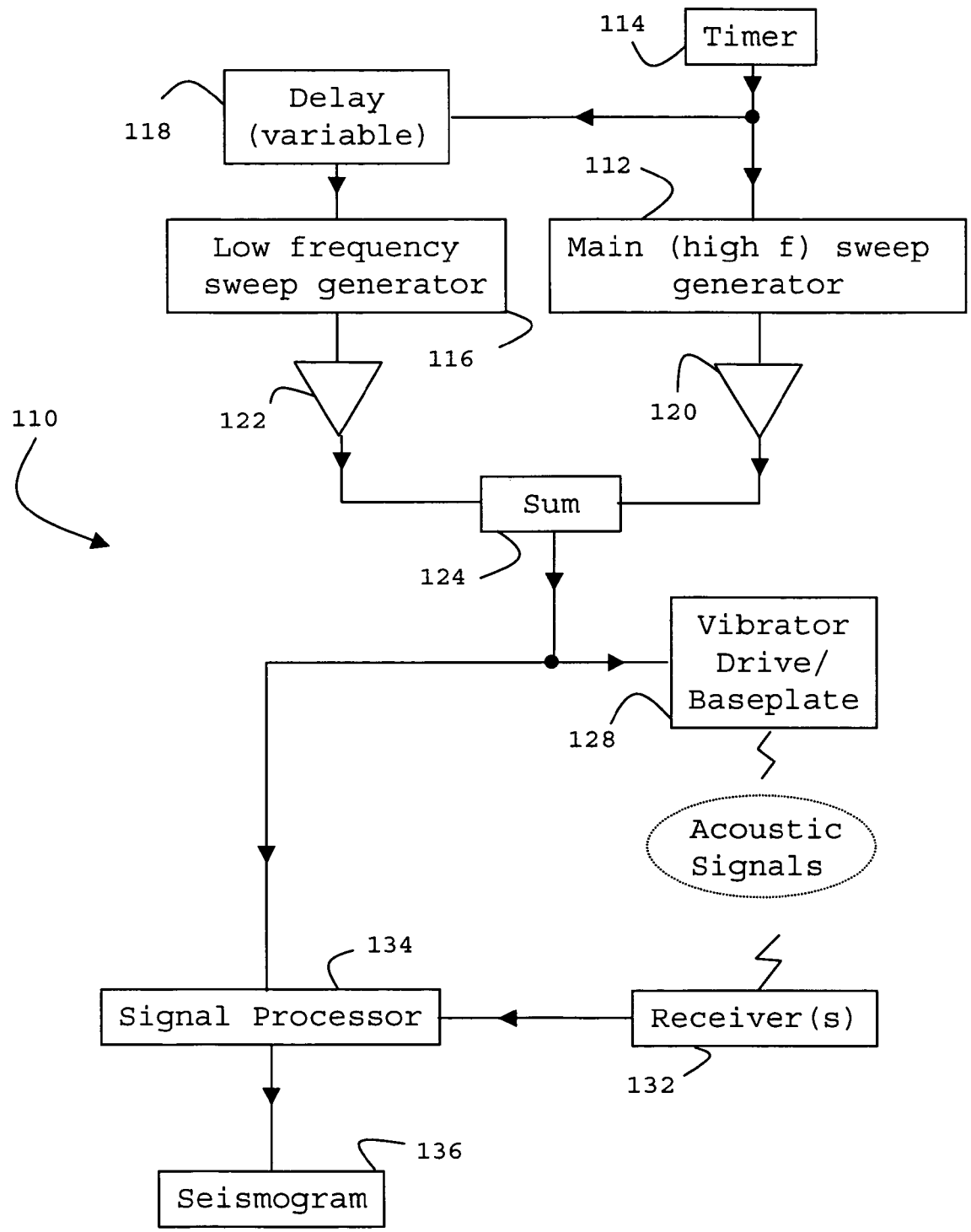
FIG. 11 is a somewhat schematic representation of seismic surveying equipment including an acoustic source in accordance with the present invention for performing the sweeps of FIGS. 1 and 7 concurrently.

The schematic block diagram of FIG. 11 illustrates a seismic surveying system 110 designed to implement the present invention. Thus the system 110 comprises a main sweep generator 112 for initiating the high frequency sweep of FIG. 1B under the control of a timer 114, and a low frequency sweep generator 116 for initiating the low frequency sweep of FIG. 7, also under the control of the timer 114, but with a predetermined delay, set by adjustable delay circuit 118, after the start of the high frequency sweep. The respective outputs of the sweep generators 112 and 116 pass via respective adjustable power amplifiers 120, 122, which are used to adjust their respective power levels, to a summing circuit 124, which sums them and applies the summed signal as a drive signal to a hydraulic drive system of a land or marine vibrator 128 having a vibratable baseplate or diaphragm. The baseplate or diaphragm is therefore driven to produce an acoustic signal which is transmitted into the earth formations in the ground or seabed beneath the vibrator 128, for reflection by the various strata making up the earth formations.

The acoustic signals reflected from the earth formations are detected by sensor arrays 132, normally geophones in a land context and hydrophones in a marine context, and the detected signals are convolved with the summed drive signal applied to the hydraulic drive system and then correlated with the desired sweep in a signal processor 134 with the to produce a seismogram which is stored on a seismogram memory 136.

As already mentioned, the prior art system suffers from problems with harmonics of the low frequencies of its low frequency sweep contaminating the resulting seismogram. The effect of this can be seen by comparing the theoretical seismograms of FIGS. 12 and 13. These model the effect on a short feature in the earth response of first using the prior-art system to illuminate that feature, and then the prior-art processing to generate a seismogram. In both figures, a band-limited spike at 0.5 seconds (height 1) has been taken—corresponding to an isolated reflector between two different strata. It has first been mathematically convolved with the vibrator sweeps to obtain the theoretical signal at the sensor, and then correlated with the same sweeps to described in the prior-art processing.

Figure 12:
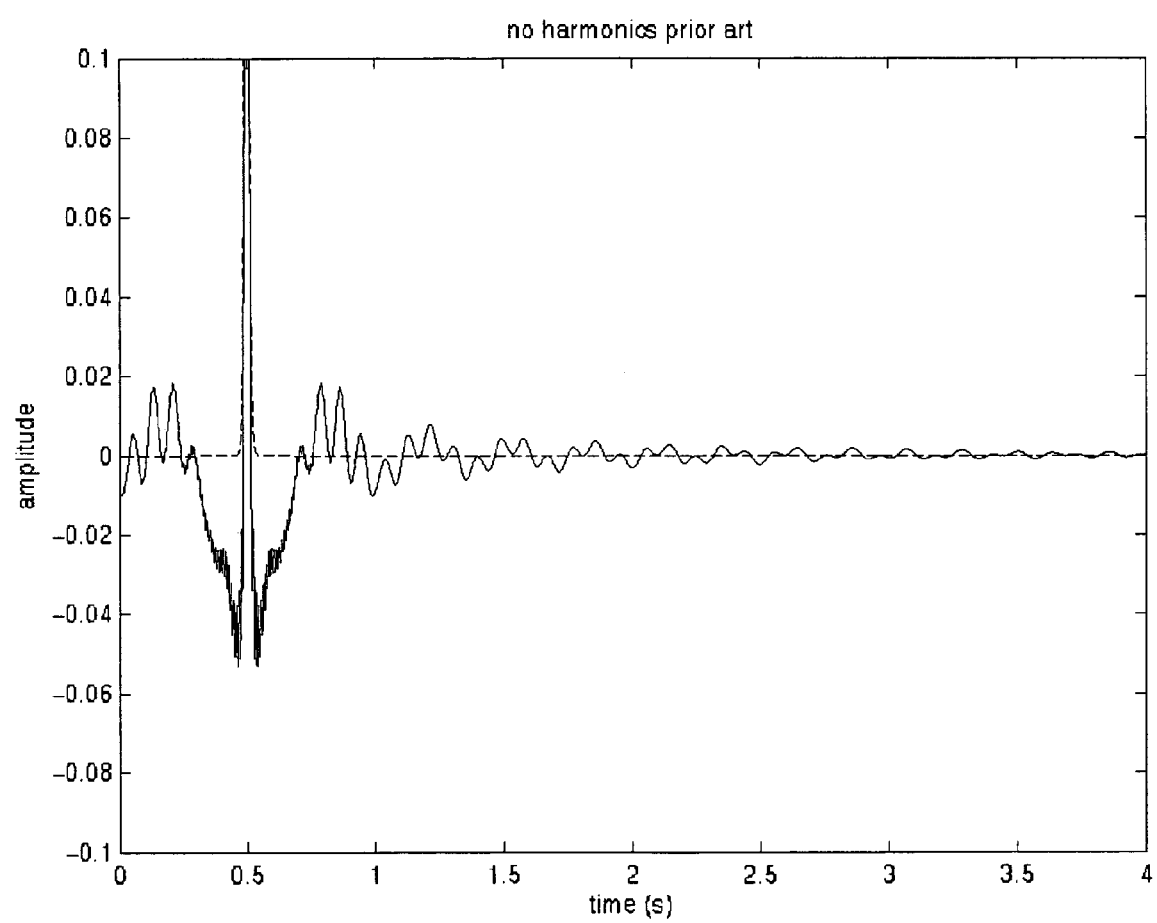
FIGS. 12 and 13 are theoretical seismograms relating to the prior art system.
Figure 13:
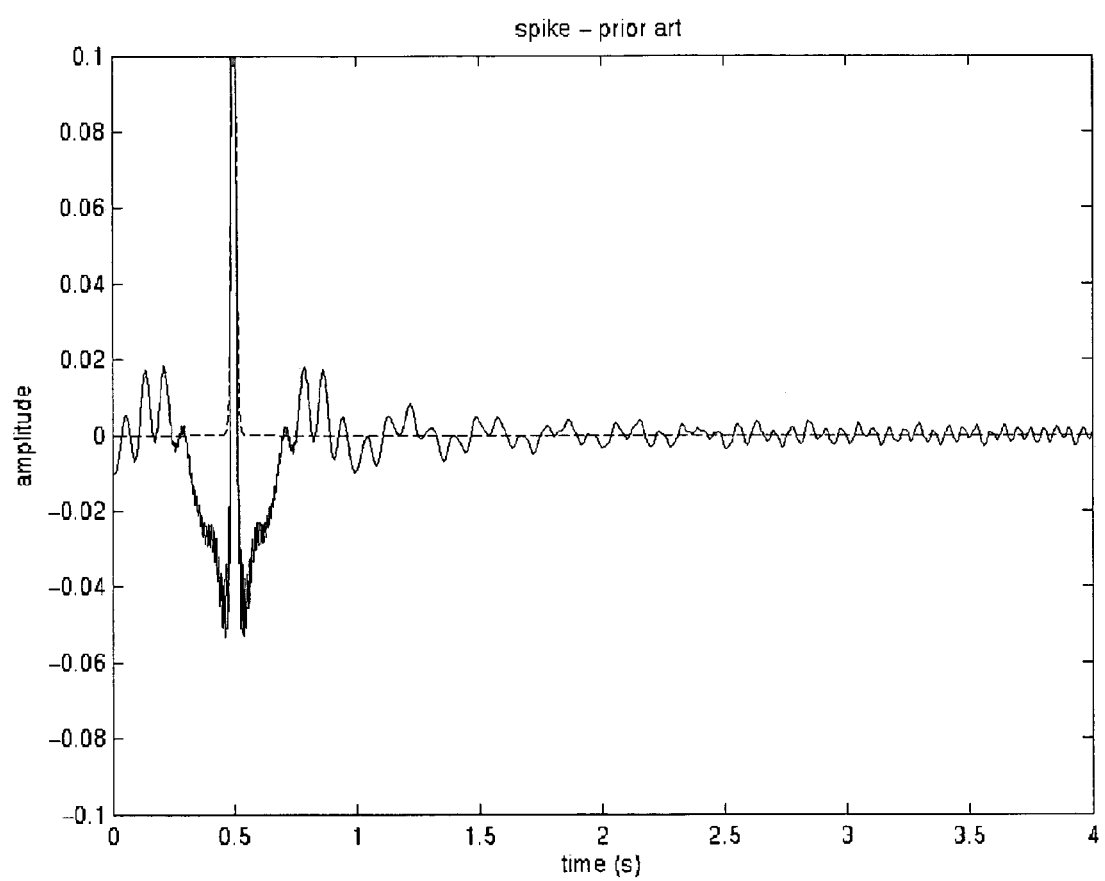

In FIG. 12, the vibrator sweeps that have been used are the sum of the sweeps shown in FIGS. 1B and 2. The ripples that appear before and after the spike are from the band-limited nature of the sweep. FIG. 13 shows the same spike, after convolving with a composite sweep with realistic levels of harmonic contamination (14% of fundamental in odd harmonics, 6% in even harmonics). Note in particular the high frequency noise appearing at times between 2 and 4 seconds. This will be a particular problem, as later events in seismograms tend to be both of lower amplitude and lower bandwidth than earlier events, and so this noise will reduce the ability to detect small events at these times.

Figure 14:
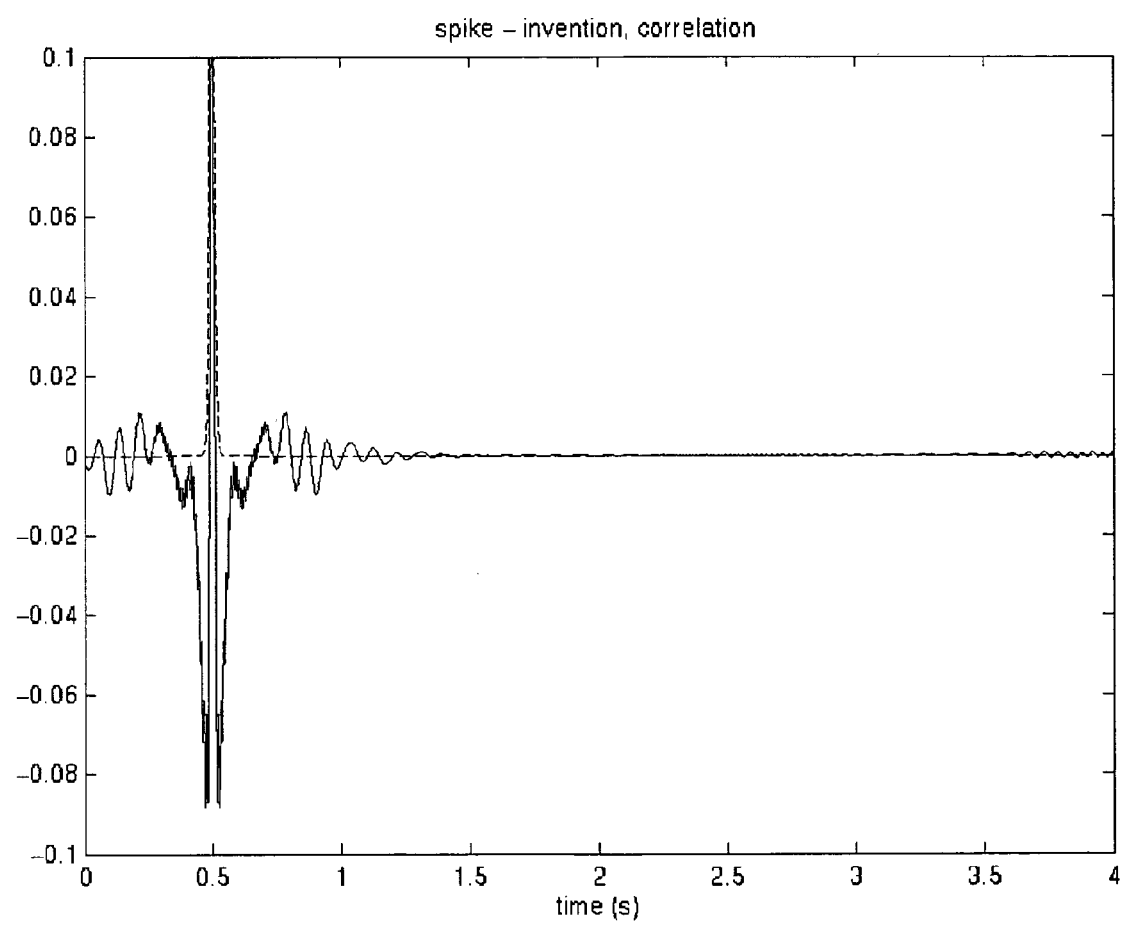
FIGS. 14 and 15 are theoretical seismograms derived for two different implementations of the present invention.
Figure 15:
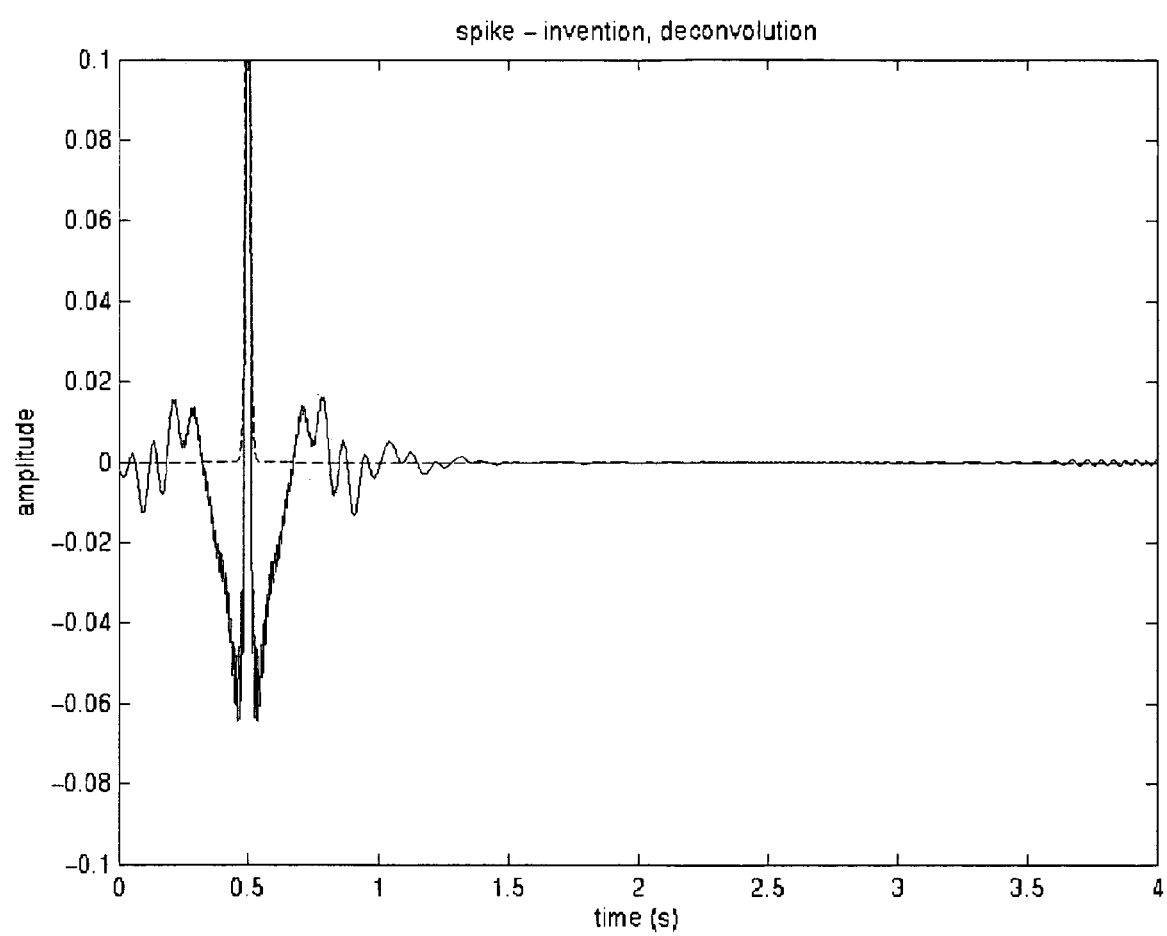

FIG. 14 is a theoretical seismogram derived for the system of the present invention. In FIG. 14, the same spike as in FIG. 12 is shown convolved with the combined sweeps (along with the same level of harmonic contamination), and correlated with the desired sweep. As can be seen, there is very little harmonic noise appearing in the seismogram.

In the prior art, the recorded signal at the receiver is correlated with the combined original sweep in order to obtain the seismogram. Writing in the frequency domain, $$\tilde{S} = (\overline{\tilde{F}_h + \tilde{F}_l}) \tilde{R} \quad [6]$$

where $\tilde{R}$ is the Fourier transform of the signal at the receiver, $\tilde{S}$ is the un-windowed Fourier transform of the seismogram and tildes over letters denote the Fourier transform, $\tilde{F}_h$ is the Fourier transform of the desired high-frequency sweep and $\tilde{F}_h$ is the Fourier transform of the desired low frequency sweep. To obtain the final seismogram, the inverse Fourier transform is performed, and the time-series windowed to between 0 time and the listening time.

If the vibrator has followed the pilot sweep exactly then $$\tilde{R} = (\tilde{F}_h + \tilde{F}_l) T \quad [7]$$

where T is the transfer function of the earth from the vibrator to the receiver.

and thus $$\tilde{S} = (\overline{\tilde{F}_h + \tilde{F}_l})(\tilde{F}_h + \tilde{F}_l) T \quad [8]$$

the cross-terms in this will all be at negative times or after the listening time and so $$\tilde{S} = (\overline{\tilde{F}_h}\tilde{F}_h + \overline{\tilde{F}_l}\tilde{F}_l) T \quad [9]$$

If the two sweeps have the same amplitude in the frequency domain, and the vibrator follows closely the desired sweep, then this will work well, however if sweeps do not follow the desired sweep exactly, then correlation will produce errors.

Additionally, if due to flow constraints the sweeps do not maintain a constant amplitude over most of the range of the sweep (such as that shown in FIG. 4), then it may be desirable to boost the reduced-amplitude frequencies so as to obtain the seismogram that would have resulted from a constant amplitude sweep.

Let $A_h$ be the desired power in the high frequency sweep, and $A_l$ the desired power in the low frequency sweep, Then by applying the operator D, given by $$D = \left(\frac{A_h}{\tilde{F}_h} + \frac{A_l}{\tilde{F}_l}\right) \quad [10]$$

to the Fourier transform of each receiver signal, we obtain $$D\tilde{R} = \left(\frac{A_h}{\tilde{F}_h} + \frac{A_l}{\tilde{F}_l}\right)\tilde{R} \approx \left(\frac{A_h}{\tilde{F}_h} + \frac{A_l}{\tilde{F}_l}\right)(\tilde{F}_h + \tilde{F}_l) T \approx (A_h + A_l) T \quad [11]$$

In practice, the vibrator may fail to follow exactly the desired sweeps, in which case the measured ground force signal may be used to obtain an estimate of the actual high and low frequency sweeps (In order to obtain an estimate of the true amplitude and phase of the fundamental component of the vibrator output, there are a number of ways in which the vibrator ground force control signal may be filtered. Among these are the use of a time-varying notch filter, and cross-correlation with the desired sweep and time-windowing close to zero-time.)

If $\tilde{M}_h$ (respectively $\tilde{M}_l$) is an estimate of the Fourier transform of the actual high (respectively low) frequency sweep—ignoring the contribution from harmonics, then a better operator $$D = \left(\frac{A_h}{\tilde{M}_h} + \frac{A_l}{\tilde{M}_l}\right) \quad [12]$$

may be used instead.

FIG. 14 shows the effect of this operation using the sweep shown in FIG. 2, where the deconvolution amplitude has been chosen to counter the effect of the amplitude ramp.

Effects such as non-linear elastic propagation in the earth may result in slightly different seismograms at the overlap frequencies between the high and low frequency sweeps. By performing the high and low frequency deconvolutions separately, and estimating a transfer function between them, valid over a number of receivers, an overall amplitude and time shift may be estimated that matches the high and low frequency components of the spectrum together.

First the high and low frequency seismograms must be evaluated independently, thus $$\tilde{S}_h = \frac{A_h}{\tilde{M}_h}\tilde{R} \quad [13]$$

$$\tilde{S}_l = \frac{A_l}{\tilde{M}_l}\tilde{R}$$

The inverse Fourier transform is applied to each seismogram, and they are time-windowed between 0 and the listening time.

They are then Fourier transformed again, to obtain the two functions $\tilde{U}_h$ and $\tilde{U}_l$ If linear elastic theory holds exactly, then the relationship $$(\tilde{U}_h A_l - \tilde{U}_l A_h) = 0 \quad [14]$$

should hold exactly. However, there may be a systematic discrepancy between the two seismograms. In this case a simple function may be sought that, in the overlap region, matches the two seismograms. One such form an amplitude factor and time shift. Let the amplitude factor be $\alpha$ and the time shift $\tau$. Then we must find the values of $\alpha$ and $\tau$ such that the average misfit $\mu$ is minimised, where $$\mu = |\tilde{U}_h A_l - \alpha \exp(2\pi i f \tau) \tilde{U}_l A_h|^2 \quad [15]$$

This average is preferably performed over all the overlap frequencies and receivers.

Having determined the optimal $\alpha$ and $\tau$, one of the two seismograms (either the high or low frequency) can be adjusted to match the other. Preferably, the low frequency seismogram is adjusted, thus the total seismogram is the inverse Fourier transform of $$(\tilde{U}_h + \alpha \exp(2\pi i f \tau)\tilde{U}_l) \quad [17]$$

If instead the high frequency seismogram were adjusted, the total seismogram would be the inverse transform of $$\left(\frac{1}{\alpha}\exp(-2\pi i f \tau)\tilde{U}_h + \tilde{U}_l\right) \quad [18]$$

Although the invention has been described in relation to hydraulically operated seismic vibrators, those skilled in the art will appreciate that it is also applicable to electromagnetically operated seismic vibrators.

The invention claimed is:

1. A vibratory source to generate acoustic signals for use in a seismic survey comprising
    a vibratable element;
    a mechanical drive system to apply a force onto the vibratable element; and
    control circuitry combining into a drive signal for the mechanical drive system a high frequency sweep signal which sweeps upwardly through a high frequency band during a first time interval and a low frequency sweep signal which is of lower amplitude than the high frequency sweep signal and which sweeps upwardly through a low frequency band during a second time interval, wherein the second time interval starts during the first time interval but after the beginning thereof.

2. The source of claim 1, wherein the low frequency band covers a lower frequency range than the high frequency band.

3. The source of claim 1, wherein the upper end of the low frequency band overlaps the lower end of the high frequency band.

4. The source of claim 3, wherein the high frequency band includes a frequency range from about 10 Hz to about 100 Hz, and the low frequency band includes a frequency range from about 2 Hz to about 12 Hz.

5. The source of claim 1, wherein the second time interval includes one or two periods in which the sweep signal is tapered.

6. A method of generating acoustic signals for use in a vibratory seismic survey, comprising the step of
    combining into a drive signal a high frequency sweep signal, which sweeps upwardly through a high frequency band during a first time interval, and a low frequency sweep signal, which is of lower amplitude than the high frequency sweep signal and which sweeps upwardly through a low frequency band during a second time interval, wherein the second time interval starts during the first time interval but after the beginning thereof; and
    applying the drive signal to a mechanical drive system for a vibratable element.

7. The method of claim 6, wherein the low frequency band covers a lower frequency range than the high frequency band.

8. The method of claim 6, wherein the upper end of the low frequency band overlaps the lower end of the high frequency band.

9. The method of claim 8, wherein the high frequency band includes a frequency range from about 10 Hz to about 100 Hz, and the low frequency band includes a frequency range from about 2 Hz to about 12 Hz.

10. The method of claim 6, wherein the low frequency sweep signal is tapered.

11. The method of claim 10, wherein the second time interval is preceded and followed by a respective taper period of about a quarter of a second.

12. The method of claim 6, wherein amplitude and/or sweep rate of the high frequency sweep signal are changed at the start of the second time interval.

13. The method of claim 6, further comprising the step of separating the combined high and low frequency sweep signals and processing acquired data using the separated signals.

14. The method of claim 6, further comprising the step of generating a low frequency seismogram and a high frequency seismogram representing the earth response to the low frequency sweep and high frequency sweep, respectively.

15. The method of claim 14, further comprising the step of matching the low frequency seismogram and the high frequency seismogram at an overlap frequency range.

16. The method of claim 15, wherein the step of matching the seismograms includes the step of determining an amplitude correction and/or time shift.

17. The method of claim 15, further comprising the step of recombining the matched low frequency seismogram and the high frequency seismogram.

* * * * *